Jan. 19, 1954
H. A. SCHNELL
2,666,377
CORRUGATOR PLOW
Filed Nov. 15, 1949
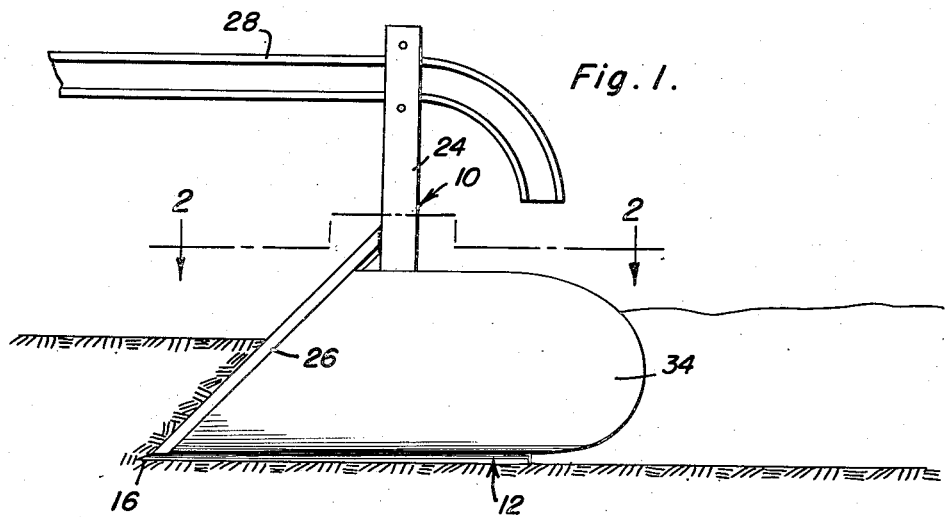
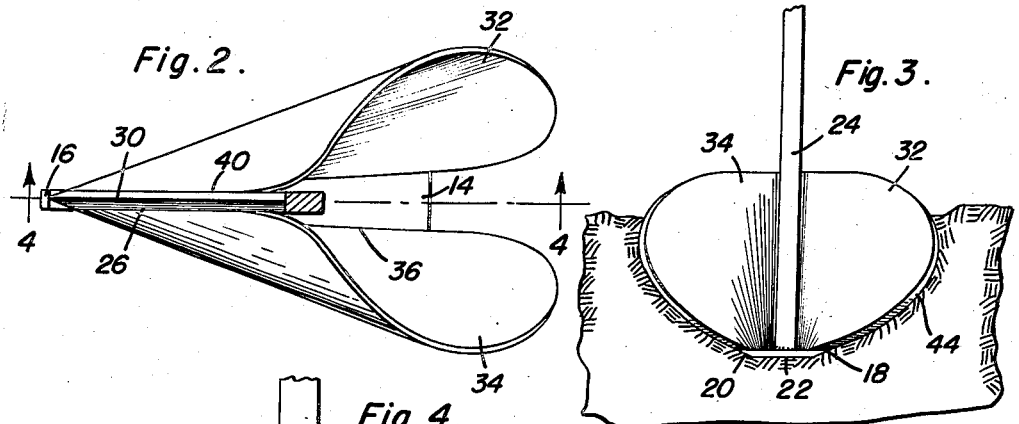
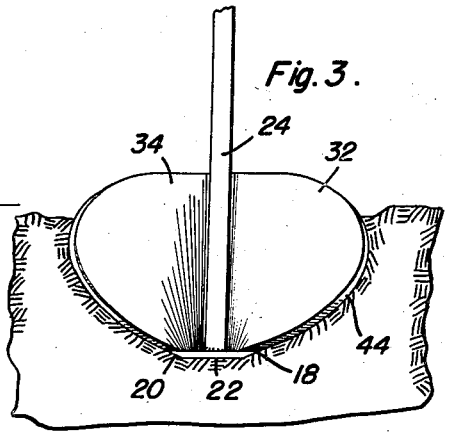
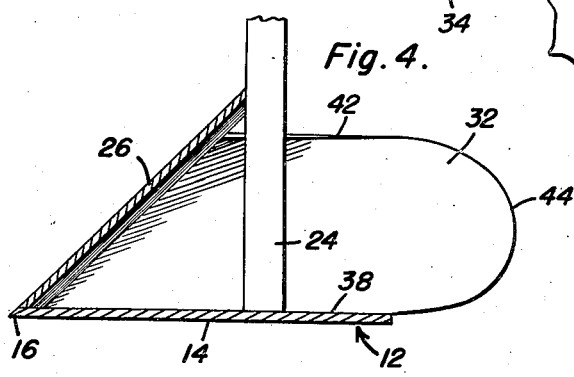
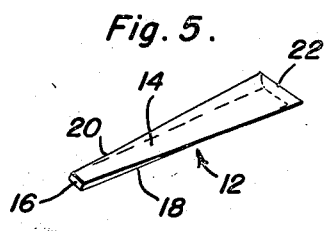
Inventor
Homer A. Schnell Patented Jan. 19, 1954

2,666,377

UNITED STATES PATENT OFFICE 2,666,377

CORRUGATOR PLOW

Homer A. Schnell, Filer, Idaho

Application November 15, 1949, Serial No. 127,305

1 Claim. (Cl. 97—225)

This invention appertains to novel improvements in corrugators or similar agricultural implements for forming furrows or irrigation channels or ditches in the ground.

The primary object of this invention is to prevent erosion of the soil by forming smooth walled furrows and by forming furrows without leaving any loose soil therein.

Another important object of this invention is to provide a compact corrugator that can be easily pulled over the ground and which will form even and smooth furrows therein.

These and ancillary objects are attained by this invention, the preferred embodiment of which is set forth in the following description and illustrated in the accompanying drawing, wherein Figure 1 is a side elevational view of a corrugator, embodying the principles of this invention;

Figure 2 is a sectional view taken on line 2—2 of Figure 1;

Figure 3 is a rear elevational view;

Figure 4 is a longitudinal sectional view taken on line 4—4 of Figure 2, and,

Figure 5 is a view in perspective of the base member.

In the accompanying drawing, the corrugator 10 includes a base member or runner 12 which is formed from an elongated rectangular bar 14, having a beveled front end 16 and outwardly beveled opposing longitudinal edges 18 and 20 adjacent the front end. The edges 18 and 20 progress into straight or plane edges toward the rear end 22 of the bar and the upper portions thereof slant outwardly in a lateral direction and overhang the edges. The rear end 22 of the bar slants upwardly and outwardly and is formed similar to the rear portions of the side edges.

A vertical standard 24 is welded at its lower end to the upper face of the runner 12 intermediate the ends thereof and is rigidified or braced by a diagonal strut or brace bar 26 which is welded to the front of the runner and to the standard intermediate its upper and lower ends. A drawbar 28 is bolted or otherwise detachably secured to the upper end of the standard and is carried by a power vehicle, such as a tractor whereby the runner is moved over the ground.

Means is mounted on the runner and secured to the bar 24, which forms a nose therefor, for forming furrows in the ground, as seen in Figure 3. Thus, the front or lead edge of the brace bar 26 is pointed as at 30 so that it may be easily moved through the ground and serve as a cutting or blade edge for the corrugator. Sides 32 and 34 are provided and are preferably formed from sheet metal or similar material. The sides are bowed outwardly and are tapered forwardly and downwardly and include lower edges 36 welded as at 38 to the runner. Rearwardly and upwardly slanted front edges 40 on the sides are formed complementary to the brace bar 26 and welded thereto, so that the upper edges 42 are disposed in a parallel horizontal plane and are spaced from each other with the rear or trailing edges 44 of the sides fanned out, as seen in Figure 3 and curved outwardly.

In use, as seen in Figure 3, the corrugator is pulled through the ground with the weight of the unit plus means associated with the drawbar 28 maintaining the corrugator in selected underground positions, so that smooth and even furrows are formed in a convenient and time saving manner.

Having described the invention, what is claimed as new is:

A corrugator for forming ground furrows comprising a flat plate runner, said runner being gradually widened in a horizontal transverse direction towards the rear of the corrugator, a vertical standard secured to the upper surface of said runner intermediate its ends, a diagonal angle bar secured to said runner at its front end and to said standard intermediate its ends, said runner, angle bar and standard forming a rigid trussed frame, the front of said runner being beveled in alignment with said angle bar, outwardly bowed rigid side sheets secured to the edges of said angle bar and extending rearwardly as an extension thereof, said sheets having their bottom edges secured to the upper face of said runner with the upper edges disposed in the same horizontal plane and spaced from each other, and the rear edges of said side sheets being curved and fanned outwardly beyond the side edges of said runner, the side edges of said runner being upwardly and outwardly beveled in alignment with the outer surface of said side sheets, and a horizontally extending drawbar rigidly secured to said standard adjacent its upper end.

HOMER A. SCHNELL.

References Cited in the file of this patent

UNITED STATES PATENTS

| Number | Name | Date |
|---|---|---|
| 187,466 | Humphreys | Feb. 20, 1877 |
| 573,368 | Stephens | Dec. 15, 1896 |
| 941,485 | Anderson | Nov. 30, 1909 |
| 1,987,268 | Roby | Jan. 8, 1935 |
| 2,312,371 | Strandlund | Mar. 2, 1943 |
| 2,424,820 | Hall | July 29, 1947 |

FOREIGN PATENTS

| Number | Country | Date |
|---|---|---|
| 3,654 | Great Britain | Feb. 22, 1905 |
| 28,081 | Great Britain | Dec. 5, 1913 |